United States Patent
Luka et al.

[11] Patent Number: 5,879,423
[45] Date of Patent: Mar. 9, 1999

[54] AIR FILTER FOR THE INTERIOR OF A MOTOR VEHICLE

[75] Inventors: Helmut Luka, Kornwestheim; Bruno Sommer, Ludwigsburg, both of Germany

[73] Assignee: Filterwerk Mann & Hummel GmbH, Ludwigsburg, Germany

[21] Appl. No.: 610,881

[22] Filed: Mar. 5, 1996

[30] Foreign Application Priority Data

Mar. 10, 1995 [DE] Germany ............... 195 08 534.5

[51] Int. Cl.⁶ ...................................... B01D 27/14
[52] U.S. Cl. ................ 55/482; 55/501; 55/502; 55/503; 55/DIG. 31
[58] Field of Search ............... 55/DIG. 31, 502, 55/495, 511, 496, 501, 503, 485, 506, 507, 504, 493, 483, 482, 385.3

[56] References Cited

U.S. PATENT DOCUMENTS

| | | | |
|---|---|---|---|
| 235,197 | 12/1880 | Bean | 55/496 |
| 428,739 | 5/1890 | Abrahamson | 55/496 |
| 3,111,489 | 11/1963 | Getzin | 55/503 |
| 3,252,580 | 5/1966 | Getzin | 55/503 |
| 3,707,046 | 12/1972 | De Baun | 55/496 |
| 5,292,432 | 3/1994 | Jainek et al. | 55/502 |
| 5,554,205 | 9/1996 | Ernst et al. | 55/385.3 |

FOREIGN PATENT DOCUMENTS

| | | | |
|---|---|---|---|
| 650908 | 2/1929 | France | 55/485 |
| 1267223 | 4/1960 | France | . |
| 3902546 | 8/1990 | Germany | . |
| 1526771 | 12/1989 | Russian Federation | 55/385.3 |

OTHER PUBLICATIONS

Abstract of Published Japanese Patent Application No. JP 62–74426.

*Primary Examiner*—Jay H. Woo
*Assistant Examiner*—Robert Hopkins
*Attorney, Agent, or Firm*—Evenson, McKeown, Edwards & Lenahan, P.L.L.C.

[57] ABSTRACT

A filter, especially for the interior ventilation of vehicles, including at least one filter body configured as a plate-like element and a frame surrounding the plate-like element, the frame being made from at least two frame parts joined together in the plane of the plate-like element.

10 Claims, 2 Drawing Sheets

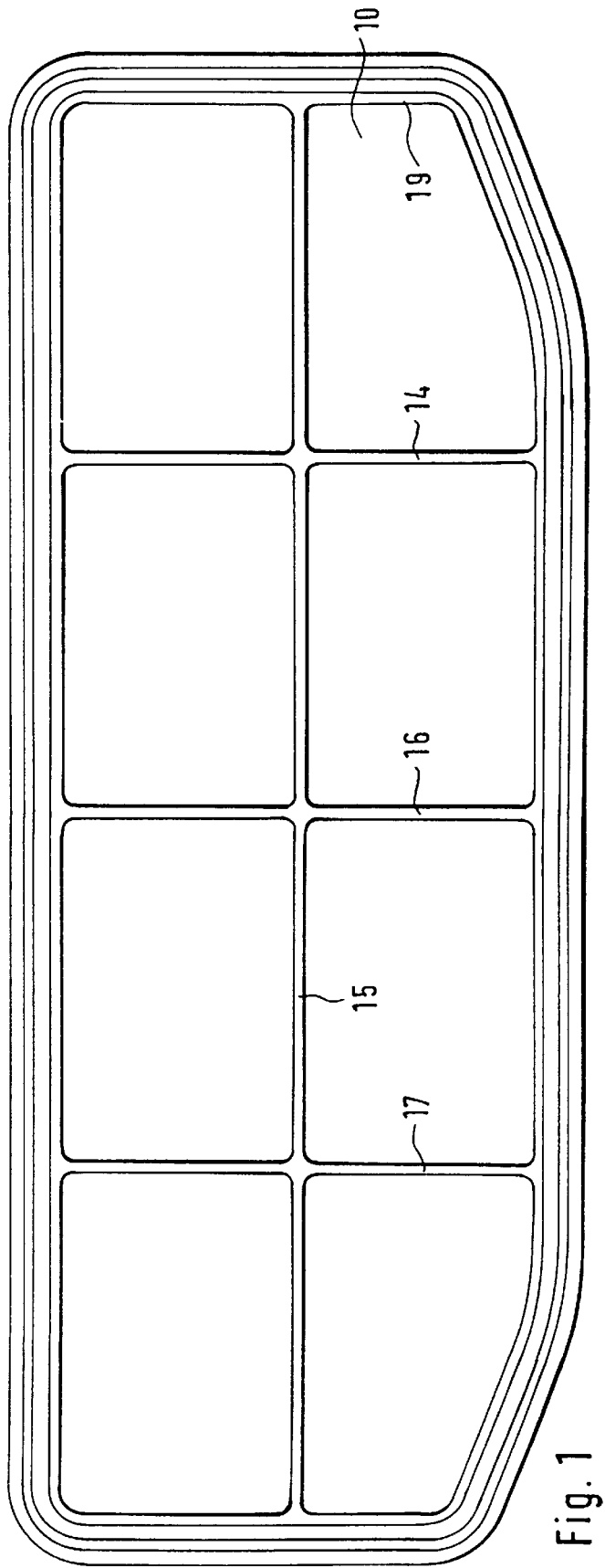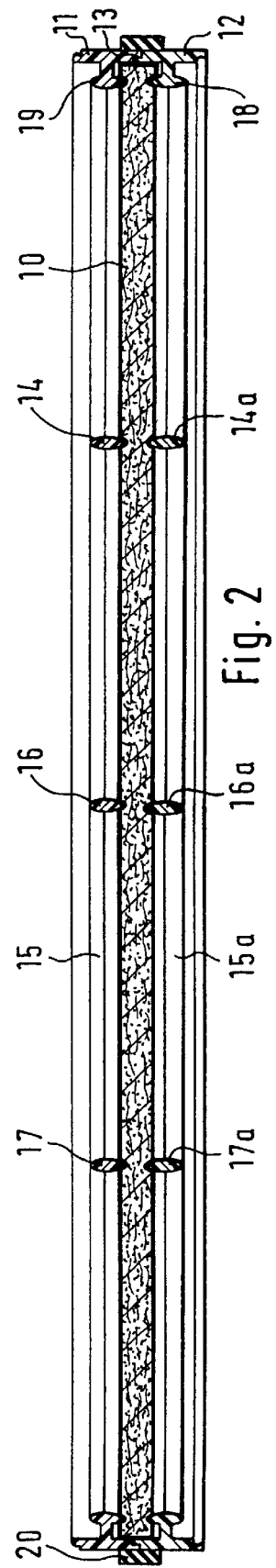

AIR FILTER FOR THE INTERIOR OF A MOTOR VEHICLE

BACKGROUND OF THE INVENTION

The invention relates to a filter with at least one filter body configured as a plate-like element and a frame surrounding the plate-like element, especially a filter suitable for filtering the air for the interior of the passenger compartment of a motor vehicle.

A filter of this general type is disclosed in published German Patent Application No. DE 3,902,546. It is used in an air conditioner of a motor vehicle and consists of at least two layers of plate-like elements of soft material and at least two circumferential frames which hold the margin of the filter body between them, and which themselves are held together by clamping means.

One disadvantage of this filter is that, depending of the number of plate-like elements, the frames must be fitted to the thickness of the filter pack. Thus, the structure of a filter element is established, and cannot be altered. It has been found, however, that each application requires a made-to-order filter, i.e., the composition of the filter pack is variable. Also, in the case of such elements for air-conditioning equipment or for the ventilation of the interior of vehicles, attention must be given to good economy in the manufacture of the filter insert, especially in consideration of environmental aspects, since such a filter insert must be regularly replaced and disposed of.

SUMMARY OF THE INVENTION

It is therefore an object of the invention to provide a filter which will be usable in a variety of applications.

Another object of the invention is to provide a filter which can be manufactured at low cost.

A further object of the invention is to provide a filter which can be installed in a simple manner.

These and other objects are achieved in accordance with the present invention by providing a filter for the interior ventilation of a vehicle, said filter comprising at least one filter body configured as a planar, plate-like element and a frame surrounding the plate-like element, said frame comprising at least two frame parts joined together in the plane of the plate-like element.

An advantage of the invention is that only a single type of frame part is necessary, and therefore only a single mold is needed if this frame part is manufactured by injection molding from plastic. The frame part is configured such that two identical frame parts are joined together and the plate-like element can be clamped between them in the plane of their junction.

In accordance with one advantageous embodiment, this frame part is provided with a snap fastener. This makes it possible to assemble the parts in an especially simple manner. Since the configuration of the frame parts is identical, a plurality of plate-like elements can be stacked one above the other, an additional frame part being added for each additional plate-like filter element.

In another embodiment of the invention, each frame part is provided with one or more cross braces in order to improve the supporting action of the frame parts. The cross braces hold the plate-like element in position and prevent accidental removal of the filter body.

In another embodiment of the invention, at least one frame part is provided with a sealing element. This sealing element may be a circumferential foam gasket or a polyurethane resin (PUR) gasket. The gasket serves to seal the frame in a housing or support.

In accordance with a further advantageous embodiment of the invention, the frame parts are provided with bead-like elements. These serve both to fix the margin of the filter body in position and to seal the margin of the filter body. Thus, no additional sealing means is needed between frame and filter body.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIG. 1 is a plan view of a filter according to the present invention;

FIG. 2 a cross sectional view of the filter shown in FIG. 1; and

DETAILED DESCRIPTION OF PREFERRED EMBODIMENTS

Figure 3:
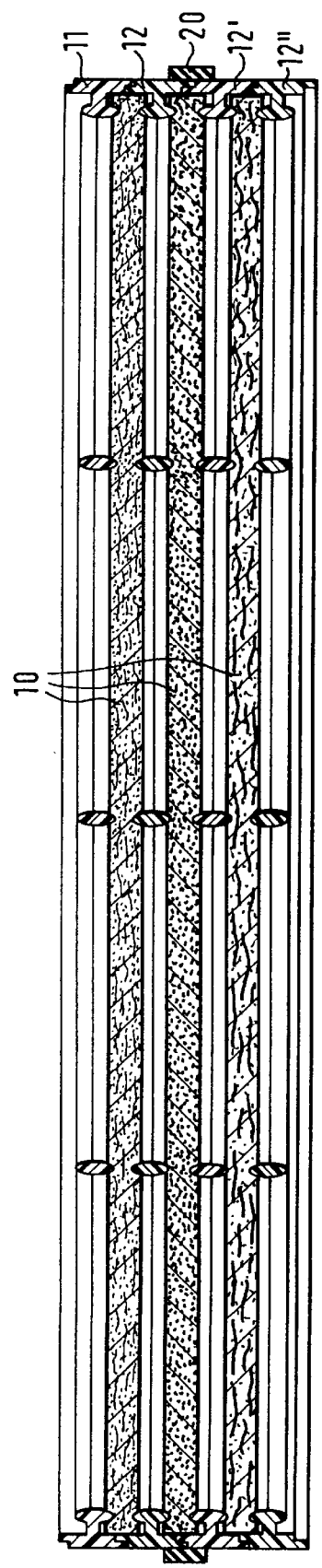
FIG. 3 a cross sectional view of a stacked filter arrangement according to the invention.

The filter illustrated in the drawings comprises a filter body 10 which is constructed in the form of a plate-like element. This filter body may comprise, for example, an active carbon mat and serves to filter the fresh air for the interior of a motor vehicle. The filter body 10 is held between two frame parts 11 and 12. The frame parts are identical and have a circumferential snap fastening 13. The two frame parts are snapped together in this manner. The frame parts are furthermore provided with cross braces 14, 15, 16, 17, and 14a, 15a, 16a, 17a to hold the filter body in the mounted position. Sealing of the filter body to the frame is achieved by circumferential bead-like elements 18 and 19. At the same time these elements also serve to hold the filter body 10 in place.

A circumferential gasket 20 serves to arrange the entire filter sealingly in a housing or mounting. Since the frame parts are identical, they also have snap fastenings on their outer edges. This makes it possible to arrange a plurality of filter bodies stacked one above the other, and to fix them in place with an additional frame part.

FIG. 3 shows a stacked filter according to the invention. A stacked filter is one which comprises a plurality of plate-like elements 10 which are coupled together in a kind of series arrangement. Since the frame parts are identical in design, it is possible to couple together any number of elements. These elements may comprise filter bodies formed of different filter materials. For example, one element may contain an active carbon filter, and another may contain a coarse filter or preliminary separator.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A filter for the interior ventilation of a vehicle, said filter comprising at least one filter body configured as a flat plate shaped element having a periphery defining a plane and a frame surrounding the periphery of the plate shaped element, said frame comprising at least two frame parts joined together in the plane of the plate shaped element, each frame part having a plurality of bead shaped elements on an interior surface of the frame part in engagement with a face of the plate shaped element for fixing the plate shaped element in position and for sealing the plate shaped element with respect to the frame, wherein said at least two frame parts are identical and can be fastened directly to each other in any desired number.

2. A filter according to claim 1, wherein the frame parts are joined together by at least one snap fastener which is located on a peripheral edge of said frame parts.

3. A filter according to claim 1, wherein each frame part is provided with a plurality of supporting cross braces for the plate shaped element, said cross braces extending between opposite sides of the frame part parallel to the plane of the plate shaped element.

4. A filter according to claim 1, further comprising a sealing element formed on at least one of the frame parts for sealing the frame in a housing.

5. A filter according to claim 2, wherein said snap fasteners located on the peripheral edges of said frame parts face perpendicularly to said plane of the plate shaped element.

6. A filter comprising:

a plurality of identical frame parts, each said frame part having a periphery which defines a frame part plane, each said frame part defining an opening on an interior side of said periphery, each said frame part having first and second snap fasteners located on peripheral edges of the frame part, said snap fasteners being configured such that the first snap fastener of any of said frame parts is engageable with the second snap fastener of any other of said frame parts, said plurality of frame parts being fastened together in a series arrangement wherein one of said first and second snap fasteners of each of said frame parts is engaged with the other of said first and second snap fasteners of an adjacent of said frame parts, and wherein said frame part planes of the plurality of frame parts are parallel; and at least one filter body having a periphery defining a filter body plane, one said filter body being arranged between each set of adjacent frame parts such that the periphery of said filter body is surrounded by the periphery of the frame parts and such that the filter body plane is parallel to said frame part plane.

7. A filter according to claim 6, wherein said first and second snap fasteners comprise peripheral edges of said frame part which face opposite each other and which face perpendicularly to said frame part plane.

8. A filter according to claim 6, wherein each said frame part further comprises at least one supporting cross brace which extends through said opening between opposite sides of said periphery of the frame part, said at least one supporting cross brace supporting said at least one filter body.

9. A filter according to claim 6, further comprising a sealing element formed on an exterior of the periphery of at least one of the frame parts for sealing the frame in a housing.

10. A filter according to claim 6, wherein each frame part is provided with a plurality of bead shaped elements which extend from said periphery of the frame part into said opening, said filter body being engaged by the bead shaped elements of a respective said set of adjacent frame parts in order to fix the filter body in position and for sealing the filter body with respect to the frame parts.

* * * * *